Aug. 12, 1941.                O. HEER                2,252,630
                   INFINITELY VARIABLE SPEED GEAR
                Filed March 22, 1940    3 Sheets—Sheet 1
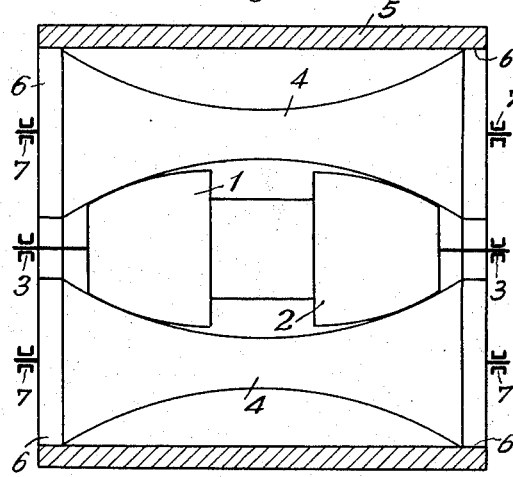
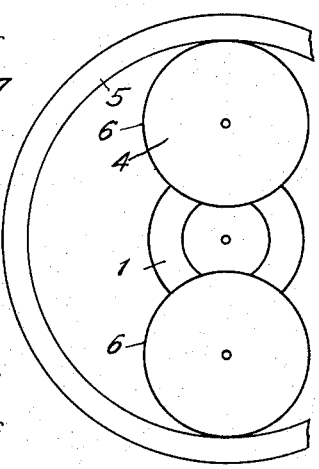
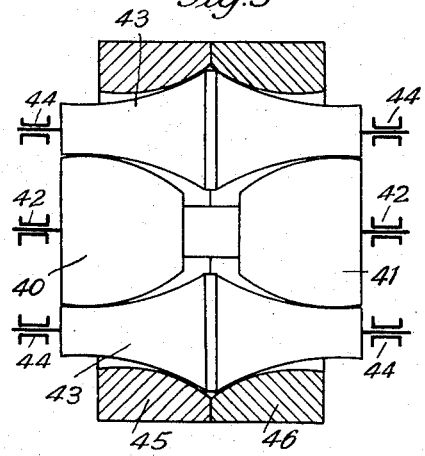
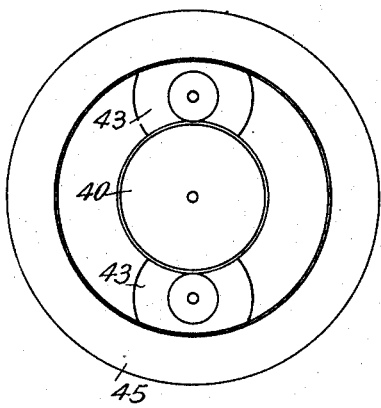
Inventor:
Oskar Heer
by Sommers & Young
Attorneys Aug. 12, 1941.     O. HEER     2,252,630
INFINITELY VARIABLE SPEED GEAR
Filed March 22, 1940     3 Sheets-Sheet 3

Inventor:
Oskar Heer
by Sommers + Young
Attorneys

Patented Aug. 12, 1941

2,252,630

UNITED STATES PATENT OFFICE 2,252,630

INFINITELY VARIABLE SPEED GEAR

Oskar Heer, Brunnen, Switzerland, assignor to Anton Bueler-Smulders, Ybach-Schwyz, Switzerland Application March 22, 1940, Serial No. 325,435
In Switzerland March 22, 1939

3 Claims. (Cl. 74—191)

This invention relates to infinitely variable speed gears in which against an elongated solid or body produced in revolution having a curved generatrix at least one further elongated solid or body produced in revolution is firmly pressed, in elastic manner, the generatrix of the second revolution body being formed by a curve mating the curve of the first named revolution body for cooperation with the latter, so that by corresponding relative adjustment of the revolution bodies the points of contacting of the two curves vary, whereby the speed ratio of the gear is varied.

In the accompanying drawings embodiments of the invention are illustrated by way of example only in which Fig. 1 is a schematic longitudinal section of the gear;

Fig. 2 shows a side elevation of Fig. 1;

Fig. 5 is a schematic view of a further embodiment of the invention depicting a longitudinal section of a modified infinitely variable speed gear;

Fig. 6 shows a side elevation of Fig. 5;

Figure 3:
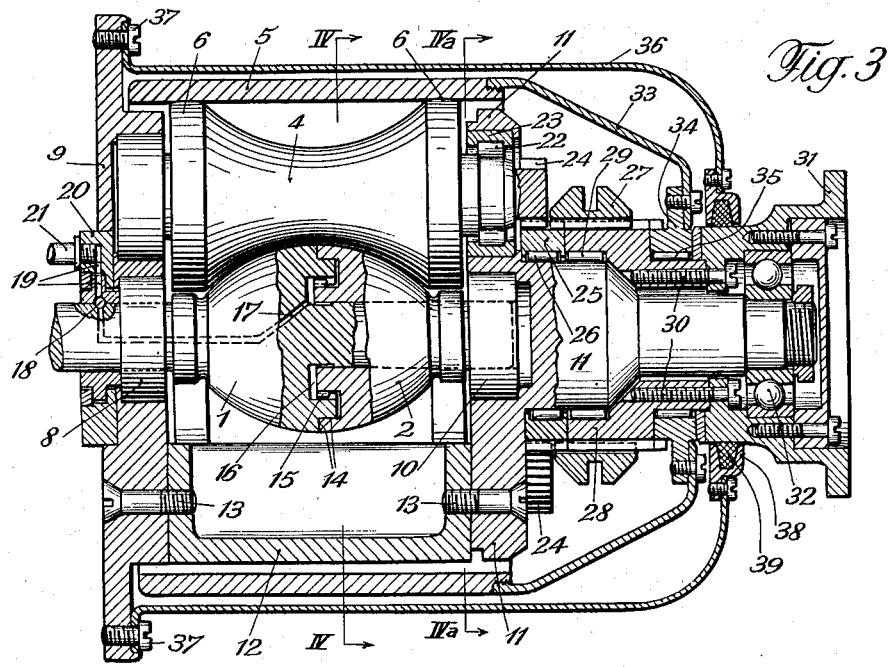
Fig. 3 shows a longitudinal section through the axis of a constructional example of the gear illustrated in Figs. 1 and 2.

In Figs. 1 and 2, the numerals 1 and 2 designate two parts of a central elongated embossed revolution body the generatrix of which is formed by a curve. The two parts 1, 2 are mounted in bearings 3 and are relatively adjustable in the axial direction of the gear. Two revolution bodies 4 symmetrically arranged relative to the axis of the revolution body 1, 2 cooperate with the latter, the generatrices of said bodies being also formed by curves which are shaped so as to be adapted to cooperate with the curve of the central revolution body 1, 2. The two outer revolution bodies 4 are surrounded by an exterior ring 5 made of spring steel which ring bears against marginal rims 6 of the outer revolution bodies 4 so as to firmly elastically press these bodies against the revolution body 1, 2 by inherent resilience. The power transmission is effected from the shaft of the revolution body 1, 2 to the axes of the revolution bodies 4, that is, to the exterior ring 5, via the points of contact between the bodies 4 and the body 1, 2. In axially adjusting the parts 1, 2 of the central revolution body relatively to each other the points of contact between the body 1, 2 and the bodies 4 change their positions on the adjacent revolution surfaces of said bodies and the ratio of gearing of the infinitely variable speed gear is varied accordingly. The bearings of the bodies 4 are designated by 7.

Figure 4:
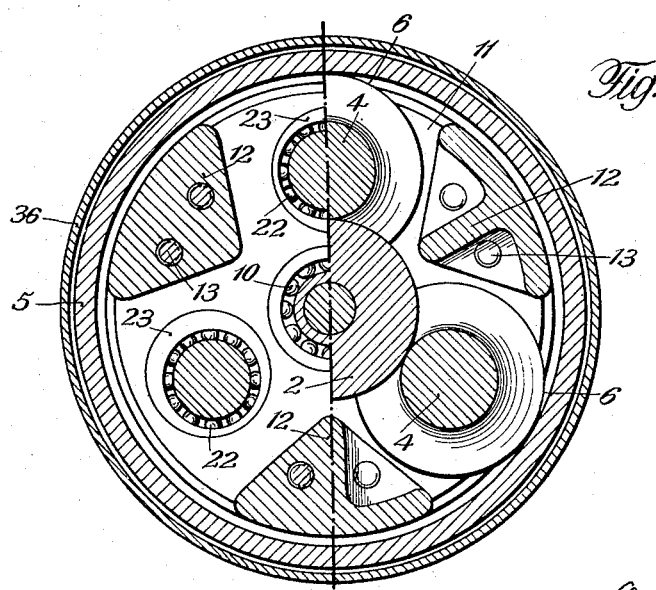
Fig. 4 is a cross section taken through the left and right parts of Fig. 3 on the lines IV—IV and IVa—IVa, respectively.

In the embodiment of the invention shown in Figs. 3 and 4, the part 1 of the central elongated embossed revolution body 1, 2 is at one end mounted in a fixed casing cover 9 by means of a roller bearing 8 and at the other end in a mounting member 11 by means of a roller bearing 10, said mounting member being connected to the cover 9 by three bars 12 by means of screws 13 connecting the bars 12 to the mounting member 11 as well as to the cover 9. The part 1 of the central revolution body protrudes through the casing cover 9 and the protruding end is coupled to the driving shaft. The part 2 of the body 1, 2 is displaceably arranged on the part 1 and the two parts interengage with each other in the middle of the gear by means of an annular setback 14 in the part 1 and a mating projection on the part 2. A recess 16 positioned radially inwardly from the setback 14 accommodates interengaging claws 15 on the peripheral wall of the recess and that of an inner annular projection on the part 2, respectively, whereby the parts 1, 2 are prevented from rotational displacement relatively to each other.

A passage 17 communicating with an annular channel 18 in the part 1 leads to the recess 16 formed between the parts 1, 2, said channel communicating in turn through a passage 19 in a closure ring 20 with a liquid supply pipe 21 connected with a motor driven liquid pump via a control valve (not shown). Operatively connected with the revolution body 1, 2 are three revolution bodies 4 which are mounted at one end in the casing cover 9 and at the other in the mounting member 11 by means of roller bearings 22 and eccentric race rings 23. The right hand end of the body 4 is provided beyond the roller bearing 22 with a pinion 24 meshing with a toothed ring 25 mounted on the mounting member 11 by means of a roller bearing 26.

Further, with the toothed portion of the ring 25 is engageable an interior toothed portion of an axially shiftable collar 27 which permanently cooperates with the gear teeth of a toothed sleeve 28. The sleeve 28 is mounted on the mounting member 11 by means of a roller bearing 29 and is firmly connected by means of screws 30 to a terminal driving sleeve 31 which is mounted on the mounting member 11 through an intervening ball bearing 32. The exterior flange of the terminal driving sleeve 30 may be connected to the driven shaft.

The exterior ring 5 cooperating with the cylindrical marginal rims 6 of the revolution bodies 4 is made of spring steel and is thus capable of yielding elastically in the radial direction and pressing the bodies 4 permanently firmly against the revolution body 1, 2. The ring 5 is connected at one end, by means of a driving member 33, to a toothed ring 34, which is rotatably mounted on the toothed sleeve 28 through the intermediary of a roller bearing 35, and with a circumferential toothed portion of which the axially shiftable collar 27 can be moved into engagement. To the casing cover 9 a gear box liner 36 is secured by screws 37. The liner 36 is sealed to the terminal driving sleeve 31 by means of an annular sealing member 38 and a packing 39.

The operation of the friction gear described in Figs. 3 and 4 is as follows:

For connecting the gear the parts 1, 2 of the central revolution body are forced apart by liquid pressure created in the recess 16 by action of the pump. Consequently, the points of contact between the generatrices of said parts and the generatrices of the revolution bodies 4 shift from the positions shown toward the ends of these bodies. The cooperating generatrices being so formed that they merge in each other at the points of contact for a relatively long stretch, the axial length for which the parts 1, 2 must travel in order that their points of contact move from the middle of the bodies 4 to the ends thereof need amount, for example, only 1 millimetre. By varying the position of the points of contact between the various revolution bodies in this manner the ratio of gearing set up therebetween is accordingly varied. When the parts 1, 2 are separated up to the maximum the ratio of gearing is a minimum. On the other hand, if by gradually closing the control valve the pressure in the delivery conduit leading out from the pump is decreased the said parts move correspondingly toward each other, so that said points of contact approach on the middle of the revolution bodies 4 and the ratio of gearing is increased. When the parts 1, 2 join with each other the point of contact lies in the middle of the revolution bodies. At this point the generatrices extend parallel with the axis of the gear, so that the movement set up between the driving and the driven revolution bodies is a normal rolling movement without additional frictional losses incurring due to obliquity between the direction of the bearing pressure between cooperating bodies and the axial direction of the gear.

In order to permit the necessary axial displacement previously described to be performed by the parts 1, 2 of the central revolution body the outer revolution bodies must be afforded a small amount of radial retraction movement in the direction away from the axis of the gear, for example of 0.3 mm., which is rendered possible by the provision of inherent spring for the exterior ring 5 and the mounting of the bodies 4 in eccentric race rings 23. The last named bodies transmit the movement via the pinion 24 to the toothed ring 25, and to the toothed ring 34 by means of the driving member 33. In the position of the collar 27 shown, the terminal driving sleeve 31 is driven by the toothed ring 25 through the medium of the toothed sleeve 28 and thus the driven shaft is moved in one direction of rotation, for example for rearward driving. By shifting the collar 27 to the right to an extent to move it into driving engagement with the toothed portion of the ring 34 the terminal driving sleeve 31 and the driven shaft are driven in the other direction of rotation, for example for forward driving.

In the schematic illustrations of Figs. 5 and 6 the parts 40, 41 of the central elongated revolution body are formed so as to be thinner at the inner ends compared with the outer ends. These parts are mounted in bearings 42 and are axially adjustable relative to each other. With the central body 40, 41 cooperate two outer revolution bodies 43 that are symmetrically arranged with regard to the central body and are thicker at their mid-portions than at their ends and mounted in bearings 4. The exterior ring surrounding the two outer revolution bodies 43 is composed of two axially displaceable parts 45, 46 which in this instance are not elastic but rigid and are provided on their insides with surfaces produced in revolution the generatrices of which cooperate with the generatrices of the revolution bodies 43 and are formed in accordance therewith. By virtue of this construction the exterior ring constitutes a second stage of ratio gearing. If the parts 40, 41 are adjusted so as to close on each other, the parts 45, 46 of the exterior ring are separated simultaneously therewith, so that the ratios of gearing obtained between the bodies 40, 41 and the bodies 43 on the one hand and the bodies 43 and the bodies 45, 46 on the other are infinitely variable.

Figure 7:
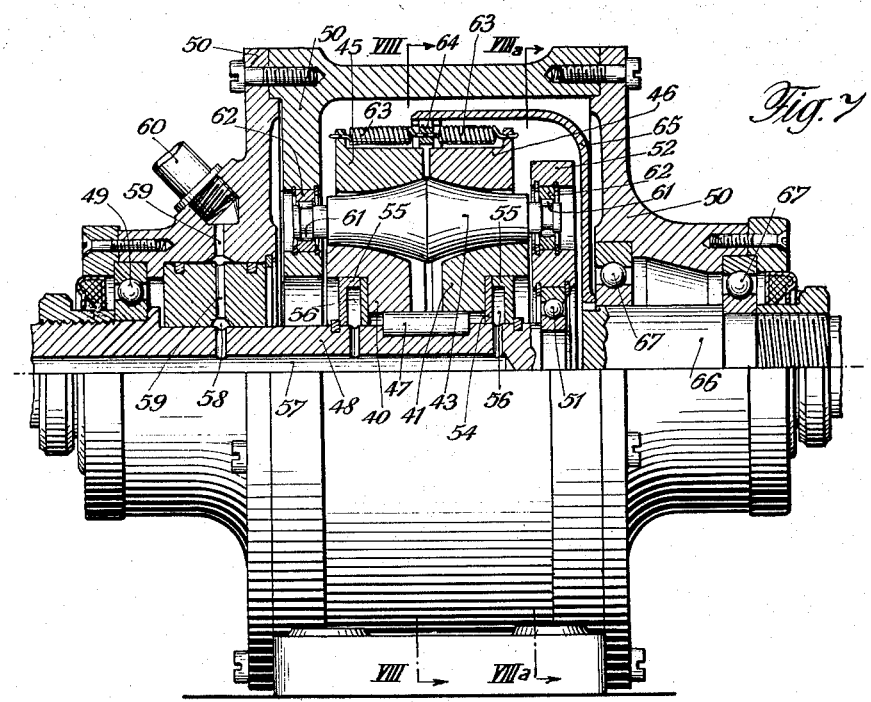
Fig. 7 is a longitudinal section of the modified gear shown in Figs. 5 and 6.
Figure 8:
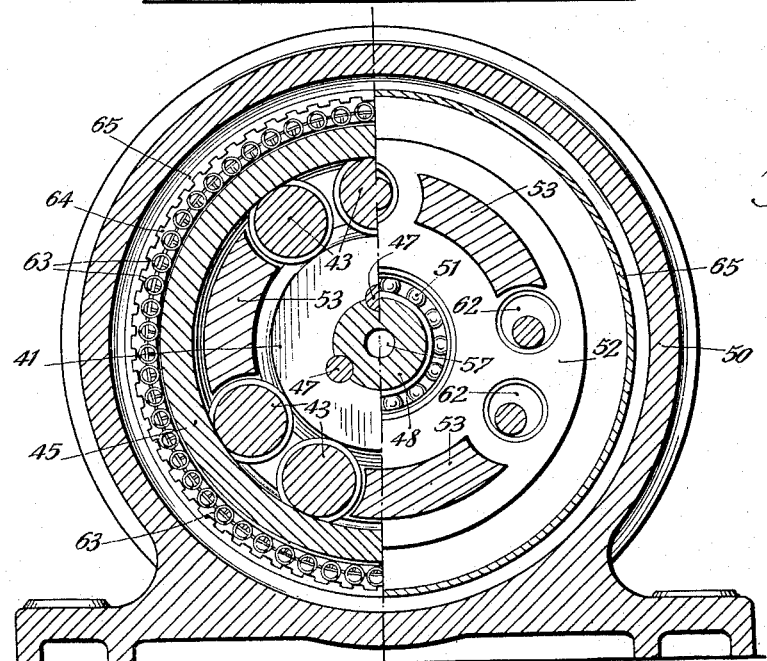
Fig. 8 is a cross section through the left and right parts of Fig. 7 on the lines VIII—VIII and VIIIa—VIIIa, respectively.

Figs. 7 and 8 show a constructional example of the embodiment of the invention schematically illustrated in Figs. 5 and 6. The two parts 40, 41 of the central elongated revolution body are axially displaceably arranged on the driving shaft 48, but kept from rotation relatively thereto by three splines. The shaft 48 is mounted in the gear casing 50 by means of a ball bearing 49 as well as in a mounting member 52 by means of a ball bearing 51, which member is fastened to the gear casing by three connecting bars 53 in a manner similar to that disclosed in connection with the example shown in Figs. 3 and 4. Each of the parts 40, 41 of the central revolution body is associated with an annular disc 54 inserted in a setback of the respective part 40 or 41 and bearing against the driving shaft 48 with its inner circumferential edge.

Between each of these discs 54 and a mating disc 55 which is fixed to the shaft 48 and bears against the bottom of the setback of the respective part 40 or 41 an annular space 56 is formed which communicates with a bore 57 in the shaft 48. The bore 57 communicates with a liquid supply conduit 60 through a circumferential channel 58 in a sealing ring arranged in the casing 50 with radial play, but kept from rotation relatively thereto, and through a passage 59, the said conduit in turn communicating with a motor driven pump via a control valve (not shown).

With the central revolution body 40, 41 cooperate six outer revolution bodies 43 (Fig. 8) which are mounted at one end in the gear casing 50 and at the other end in the mounting member 52 by means of roller bearings 61 and eccentric race rings 62. The rigid parts 45, 46 provided with inner surfaces produced in revolution are connected by means of a great number of tension springs 63 to a power transmitting ring 64 located in the transverse middle plane of the revolution bodies, the springs being distributed over all the circumference of the ring 64, as shown in Fig. 8. The ring 64 is operatively connected with a driving member 65, through the intermediary of gear teeth, which is arranged on the driven shaft 66 which is mounted in the casing 50 by means of two ball bearings 67.

The gear shown in Figs. 7 and 8 operates in the following manner:

In connecting the gear the parts 40, 41 are forced against each other by effect of the liquid pressure created in the spaces 56 by action of the pump. By this means the points of contact between the generatrices of these parts and those of the revolution bodies 43 shift from their positions at the ends of the latter, as shown, toward the mid-portion of said bodies. Simultaneously therewith the revolution bodies are displaced radially outwardly for a small amount while the eccentric race rings 62 rock accordingly. At the same time the parts 45, 46 of the exterior ring are moved apart in the axial direction against the action of the springs 63, so that the points of contact between the generatrices of the revolution bodies 43 and those of the surfaces of revolution of the parts of the exterior ring are shifted from the middle of the revolution bodies toward the ends of the latter, and the ratio of gearing obtained between the bodies 43 and the parts 45, 46 of the exterior ring is accordingly varied. The rotational movement of the parts 45, 46 of the exterior ring is transmitted by the springs 63 to the power transmitting ring 64 and thence via the driving member 65 to the driven shaft 66 which in this instance can be driven only in one direction of rotation.

In all the embodiments of the invention disclosed, particularly in the embodiment represented by Figs. 7 and 8, the bearing or friction pressure is transmitted to a number of revolution or friction bodies through the intermediary of rigid members that are safe to bending strains. In these arrangements the provision of recesses in the race track has the result that the friction bodies rolling along the recesses are relieved, in consequence of which, the adjacent friction bodies are more heavily loaded. By this means the specific bearing pressures can be increased whereby the power transmitted by the gear is accordingly increased.

Advantageously, the revolution bodies may be cooled by means of a cooling liquid.

What I claim is:

1. In an infinitely variable speed gear, in combination, a driving shaft and a driven shaft, a plurality of elongated friction bodies of revolution symmetrically tapering toward their ends and the tapering surfaces shaped according to a curved generatrix, two inner race rings having curved surfaces in frictional engagement with said friction bodies, said inner race rings being in driving connection with one of said shafts, means for varying the distance between said race rings, two outer race rings having curved surfaces cooperating with said friction bodies, resiliently yielding means operatively connected to said outer race rings for urging said outer race rings towards each other, and a driving connection between said resiliently yielding means and the other of said shafts for automatically adjusting the pressure exerted by said yielding means on said outer rings in accordance with variations in the power transmitted.

2. In an infinitely variable speed gear, in combination, a driving shaft and a driven shaft, a plurality of elongated friction bodies of revolution symmetrically tapering toward their ends and the tapering surfaces being shaped according to a curved generatrix, stationary means in which said friction bodies are rotatably mounted, two inner race rings having curved surfaces in frictional engagement with said friction bodies, said surfaces havng a generatrix formed by a curve merging in the curve of said elongated friction bodies, said inner race rings being in driving connection with one of said shafts, means for varying the distance between said race rings, two outer race rings having curved surfaces cooperating with said friction bodies, said surfaces having a generatrix formed by a curve merging in the curve of the elongated friction bodies, resiliently yielding means operatively connected to said outer race rings for urging said outer race rings towards each other, and a driving connection between said resiliently yielding means and the other of said shafts for automatically adjusting the pressure exerted by said yielding means on said outer rings in accordance with variations in the power transmitted.

3. In an infinitely variable speed gear, in combination, a driving shaft, a driven shaft, a plurality of elongated friction bodies of revolution symmetrically tapering toward their ends and the tapering surfaces being shaped according to a curved generatrix, stationary means in which said friction bodies are rotatably mounted, two inner race rings having curved surfaces in frictional engagement with said friction bodies, said surfaces havng a generatrix formed by a curve merging in the curve of said elongated friction bodies, said inner race rings being in driving connection with one of said shafts, means for varying the distance between said race rings, two outer race rings having curved surfaces cooperating with said friction bodies, said surfaces having a generatrix formed by a curve merging into the curve of the elongated friction bodies, tension springs operatively connected to said outer race rings for urging said outer race rings towards each other, and a driving connection between said tension springs and the other of said shafts for automatically adjusting the pressure exerted by said tension springs on said outer rings in accordance with variations in the power transmitted.

OSKAR HEER.